United States Patent [19]

Matsumoto

[11] 3,953,865
[45] Apr. 27, 1976

[54] ELECTRIC SHUTTER

[75] Inventor: Kunio Matsumoto, Ageo, Japan

[73] Assignee: Copal Company Limited, Tokyo, Japan

[22] Filed: Nov. 12, 1974

[21] Appl. No.: 523,120

[30] Foreign Application Priority Data
Nov. 15, 1973 Japan.............................. 48-128585
May 4, 1974 Japan.............................. 49-50041

[52] U.S. Cl. ................................. 354/29; 354/38; 354/43; 354/51; 354/60 R; 354/230
[51] Int. Cl.² ............................................ G03B 7/14
[58] Field of Search .................. 354/26, 29, 30, 36, 354/38, 43, 51, 60 R, 230

[56] References Cited
UNITED STATES PATENTS
3,626,825  12/1971  Years................................. 354/26

*Primary Examiner*—L. T. Hix
*Assistant Examiner*—Russell E. Adams, Jr.
*Attorney, Agent, or Firm*—Cushman, Darby & Cushman

[57] ABSTRACT

An electric shutter comprising a diaphragm-aperture controlling cam plate which is started by shutter release operation, an electro-magnet capable of stopping the movement of said cam plate, and an RC delay circuit capable of controlling the energizing time of said electromagnet, in order (1) that the diaphragm aperture can be automatically set according to brightness of the object to be photographed and (2) that exposure can be carried out at a proper shutter speed taking the setting of the diaphragm aperture into consideration.

6 Claims, 7 Drawing Figures

3,953,865

ELECTRIC SHUTTER

BACKGROUND OF THE INVENTION a. Field of the Invention

The present invention relates to an electric shutter for cameras and, more particularly, to a programmed type electric shutter arranged so that the diaphragm aperture and shutter speed will be automatically set according to brightness of the object to be photographed.

b. Description of the Prior Art

Some known program-type electric shutters are arranged to operate a diaphragm means positioned in front of a light-receiving element, according to exposure characteristics of the shutter, so as to establish the diaphragm aperture. Others are arranged to continuously vary the voltage developed by a comparison circuit or to vary a comparison resistance stepwise, in order to determine the diaphragm aperture, according to exposure characteristics of the shutter. The former has a disadvantage that exposure becomes inaccurate, when a photoelectric element such as CdS is used, because of delay of response. The latter has various problems in its performance and durability because many contacts are required for changing a variable resistor on switching among resistors. Moreover, known shutters of this type generally have a disadvantage in that the shutter mechanism becomes complicated.

SUMMARY OF THE INVENTION

It is, therefore, a primary object of the present invention to provide a programmed-type electric shutter having comparatively simple exposure control circuit and shutter mechanism and capable of controlling the exposure extremely accurately.

Another object of the present invention is to provide a programmed-type electric shutter applicable to shutters in which diaphragm blades also serve as shutter blades and to shutters in which the diaphragm blades and shutter blades are separate so as to significantly improve the exposure characteristics of the shutter.

DETAILED DESCRIPTION OF PREFERRED EMBODIMENTS

First, an exposure control circuit in accordance with the present invention, capable of use with a programmed-type electric shutter of the type wherein diaphragm blades also serve as shutter blades, will be described referring to FIG. 1. Reference symbols $C_1$ and $R_1$ respectively represent a capacitor and photoconductive element which together constitute a delay circuit for controlling the exposure time. Reference symbols $C_2$ and $R_2$ respectively represent a capacitor and resistor which constitute a delay circuit for controlling the diaphragm aperture. Reference symbol $R_3$ represents a comparison resistor which is capable of constituting a voltage-dividing circuit in combination with said photoconductive element $R_1$. Reference symbols $T_1$ through $T_5$ respectively represent transistors. Reference symbol M represents an electro-magnet which is used for stopping the motion of a cam plate for controlling the diaphragm aperture as will be described later and for controlling the closing motion of the shutter blades. Reference symbol E represents an electric power source, reference symbol $S_1$ represents a power switch, reference symbol $S_2$ represents on ON-OFF switch, and reference symbols $S_3$ and $S_4$ respectively represent change-over switches. Reference symbol F represents a diaphragm for receiving light from the object to be photographed in accordance with exposure factors such as film sensitivity. The diaphragm is arranged in front of said photoconductive element $R_1$.

Figure 2:
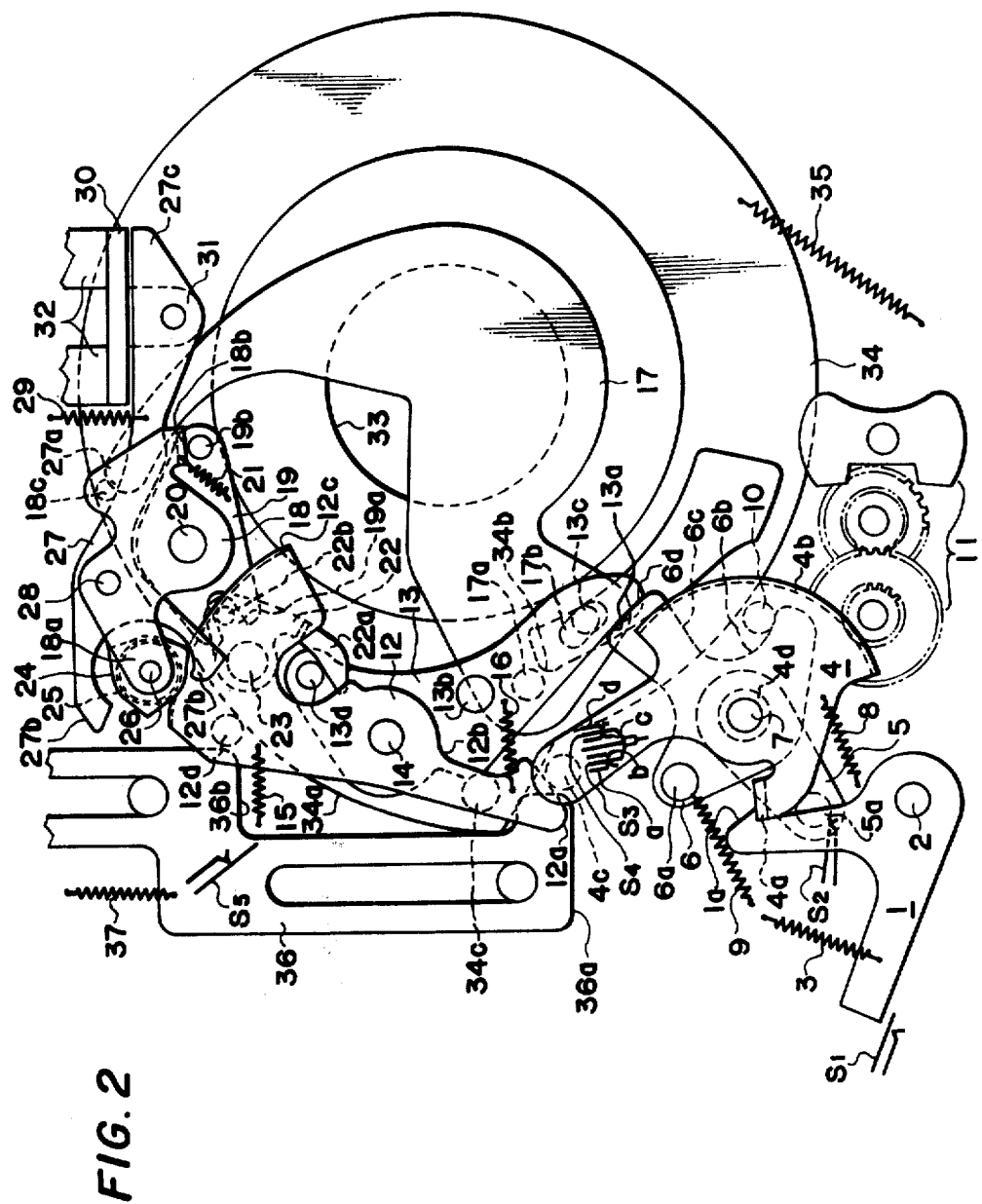
FIG. 2 shows a plan view of an embodiment of the shutter mechanism having diaphragm blades which also serve as shutter blades, with the circuit shown in FIG. 1, the mechanism being adapted for use and being illustrated in a cocked state.

An embodiment of the programmed-type electric shutter according to the present invention is described below referring to FIG. 2. In FIG. 2, numeral 1 designates a release lever pivotably mounted to a pin 2 which has a hook portion 1a and is biased clockwise by a spring 3. Said lever 1 is arranged to close said power switch $S_1$ in the initial stage of its counterclockwise rotation. Numeral 4 designates a release actuating lever pivotably mounted to a pin 7. Said lever 4 has a bent portion 4a, which engages with said hook portion 1a, a gear portion 4b and a pin 4c and is biased clockwise by a spring 8. Numeral 5 designates an arm which is connected integrally with said release actuating lever 4 by a cylindrical portion 4d of said lever 4 and which has a pin 5b. Said arm 5 opens said switch $S_2$ in the initial stage of its clockwise rotation. Numeral 6 designates an opening release lever pivotably mounted to the cylindrical portion 4d of said release actuating lever 4 and having a pin 6a engageable with the bent portion 4a of said lever 4. Additionally, said opening release lever has two side surfaces 6b and 6c, which are engageable with a pin 10 fixed to a base plate not shown, and an arcuate side surface 6d. Lever 6 is biased counterclockwise by a spring 9. Numeral 11 designates a gear governor meshing with the gear portion 4b of said release actuating lever 4 and used for delaying the clockwise rotation of said release actuating lever 4. Numeral 12 designates a closing actuating lever pivotably mounted to a pin 14. Said closing actuating lever 12 has a side surface 12a engageable with the pin 4c of said release actuating lever 4, inner side surface 12b, gear portion 12c and pin 12d, and lever 12 is biased counterclockwise by a closing actuating spring 15. Numeral 13 designates an opening and closing lever pivotably mounted to the pin 14. Said opening and closing lever 13 has a side surface 13a engageable with the arcuate side surface 6d of said opening release lever 6, a pin 13b engageable with the inner side surface 12b of said closing actuating lever 12 and pins 13c and 13d, and lever 13 is biased clockwise by an actuating spring 16, which is connected between said opening and closing lever 13 and said closing actuating lever 12. Said opening release lever 6 changes over said change-over switch $S_3$ from the contact a to the contact b just before its arcuate side surface 6d disengages from the side surface 13a of said opening and closing lever 13 during the clockwise rotation of said opening release lever 6 and, almost at the same time as the arcuate side surface 6d disengages, said opening release lever 6 also changes over said change-over switch $S_4$ from the contact c to the contact d. Numeral 17 designates one of a set of shutter blades comprising two blades serving also as diaphragm blades. Said shutter blade 17 has a fulcrum pin 17a fitted to a hole of the not shown base plate and a slot 17b into which the pin 13c of said opening and closing lever 13 is fitted. Numeral 18 designates an armature operating lever pivotably mounted to a pin 20 and having an arm 18a, bent portion 18b and pin 18c. Numeral 19 designates a first hold-releasing lever pivotably mounted to the pin 20 and having a fork portion 19a and pin 19b. Numeral 21 designates a closing release actuating spring connected between said armature operating lever 18 and first hold-releasing lever 19 and arranged so that a force for clockwise motion of the armature operating lever 18 is obtained by clockwise motion of said release lever 19. Numeral 22 designates a second hold-releasing lever pivotably mounted to a pin 23 and having an arm 22a engageable with the pin 13d of said opening and closing lever 13 and a pin 22b to be fitted to the fork portion 19a of said first hold-releasing lever 19. Numeral 24 designates a triangular cam rotatable mounted to a supporting pin 26, which is secured to the arm 18a of said armature operating lever 18. Numeral 25 designates a gear connected integrally with the triangular cam 24 and capable of meshing with the gear portion 12c of said closing actuating lever 12. Numeral 27 designates an armature lever pivotably mounted to a supporting pin 28, which is fixed to said armature operating lever 18. Said armature lever 27 has an intermediate portion 27a located between the bent portion 18b and pin 18c of said armature operating lever 18, an anchor portion 27b engageable with said triangular cam 24, and an arm 27c and lever 27 is biased counterclockwise by a weak spring 29. Numeral 30 designates an armature pivotably mounted to a supporting pin 31 which is fixed to the arm 27c of said armature lever 27 and faces a core 32 of said electro-magnet M. Numeral 33 designates an exposure aperture formed in the base plate. Numeral 34 designates a diaphragm aperture controlling cam plate arranged to be rotatable around said exposure aperture 33 and having a cam surface 34a, (which can follow the movement of the pin 12d of said closing actuating lever 12), a cam surface 34b for determining the diaphragm aperture (i.e., for the purpose of controlling the amount of movement of the pin 13c of said opening and closing lever 13), and a pin 34c. Cam plate 34 is biased clockwise by a spring 35. Numeral 36 designates a cocking plate arranged to be movable in upward and downward directions. The cocking plate 36 has an end face 36a, which can push the pin 5a of said arm 5, and an end face 36b which can push the pin 34c of said diaphragm aperture controlling cam plate 34. Plate 36 is biased upward by a spring 37. The operation of said electric shutter now will be described.

When the release lever 1 is rotated counterclockwise from the cocked position shown in FIG. 2 against the force of the spring 3, the power switch $S_1$ is closed. At that time, the base of the transistor $T_1$ is biased by a voltage $V_1$ divided by the photoconductive element $R_1$ and comparison resistor $R_3$, i.e. $E(R_1/R_1 + R_3)$. In this state, transistors $T_1$, $T_2$ and $T_3$ turn ON, the transistor $T_4$ is OFF and the transistor $T_5$ turns ON.

When said lever 1 is further rotated counterclockwise and the hook portion 1a disengages from the bent portion 4a, the release actuating lever 4 rotates clockwise, as does the arm 5, due to the force of the spring 8. At this time, the clockwise rotation of said actuating lever 4 is delayed by the action of the governor 11 meshing with the gear portion 4b.

The switch $S_2$ is then opened by movement of the pin 5a involved in clockwise rotation of the arm 5. Therefore, the capacitor $C_2$ is charged through the resistor $R_2$ because the transistor $T_5$ is in ON state. The voltage $V_2$ of the capacitor $C_2$ is expressed by a formula $E(1 - e^{-t/C_2R_2})$ and rises as time passes.

The electro-magnet M is not energized at first because the transistor $T_4$ is in OFF state. When, however, the voltage $V_2$ of the capacitor $C_2$ rises as described above, and the relation between potential of the base and potential of the emitter of the transistor $T_1$ becomes $V_1 \leq V_2$, the transistor $T_1$, which was in ON state, shuts OFF and consequently the transistor $T_4$ turns ON the electro-magnet M to be energized.

When the electro-magnet M is not energized, the armature lever 27 is not attracted by the electro-magnet M. Therefore, the closing actuating lever 12 is rotated counterclockwise by the force of the spring 15 so that its side surface 12a follows the movement of the pin 4c involved in clockwise rotation of the release actuating lever 4. Because of counterclockwise rotation of the closing actuating lever 12, the gear 25 meshing with the gear portion 12c is rotated and, consequently, the triangular cam 24 also rotates integrally with the gear 25. Therefore, the armature lever 27 swings, using the supporting pin 28 as a fulcrum, as the anchor portion 27b is intermittently operated by the triangular cam 24. During the time when the armature lever 27 can be swung, the closing actuating lever 12 can be rotated counterclockwise. The swinging range of the armature lever 12 is limited by the fact that the intermediate portion 27a engages with the bent portion 18b and pin 18c of the armature operating lever 18. Clockwise swing of the armature lever 27 is carried out against the force of the weak spring 29 and its counterclockwise swing is carried out by the force of the spring 29.

On the other hand, said cam plate 34 is rotated clockwise by the force of the spring 35 so that the cam surface 34a follows the movement of the pin 12a caused by counterclockwise rotation of the closing actuating lever 12. As a result, the position of said cam surface 34b, at which the pin 13c of the opening and closing lever 13 is to be stopped, changes.

When the afore-mentioned relation of potential becomes $V_1 \leq V_2$ in the above-mentioned process of operation, and the electro-magnet M is energized as transistors $T_1$ through $T_3$ switch OFF and the transistor $T_4$ turns ON, the armature 30 of the armature lever 27 is attracted by the core 32 and, consequently, the armature lever 27 cannot be swung any more.

Therefore, the closing actuating lever 12 cannot be turned counterclockwise from that time on even if the pin 4c of the release actuating lever 4 is further turned clockwise. At such time, clockwise rotation of the diaphram-aperture controlling cam plate 34 is also stopped and the position of the cam surface 34b at which the pin 13c is to be stopped is established. Aditionally as the transistor $T_4$ turns ON and the transistor $T_5$ shuts OFF charging of the capacitor $C_2$ is also stopped and a certain voltage is stored by the capacitor $C_2$.

Because of further clockwise rotation of the release actuating lever 4 after the above sequence, its bent portion 4a engages with the pin 6a and, after that, the release actuating lever 4 further rotates clockwise, together with the opening release lever 6, against the force of the spring 9. When the arcuate side surface 6d disengages from the side surface 13a because of clockwise rotation of the opening release lever 6, the opening and closing lever 13 is rotated clockwise by the force of the spring 16 until the pin 13c contacts the cam surface 34b of the cam plate 34 at the established position described above. Consequently, the shutter blade 17 is rotated clockwise around the pin 17a and is opened by an amount correspondng to the amount of movement of the pin 13c. Furthermore, because of movement of the pin 13d caused by counterclockwise rotation of the opening and closing lever 13, the arm 22a is pushed and the second hold-releasing lever 22 is turned counterclockwise. Additionally, the fork portion 19a is pushed by the pin 22b and the first hold-releasing lever 19 is rotated clockwise against the force of the spring 21, in other words, rotated to charge the spring 21.

At a time just before the shutter blade 17 is actually opened, the change-over switch $S_3$ moves from contact a to contact b because of the movement of the pin 6a caused by clockwise rotation of the opening release lever 6 and, at the time the change-over switch $S_4$ is repositioned from the contact c to the contact d. Thus, the delay circuit comprising the capacitor $C_1$ and photoconductive element $R_1$ is connected to the base of the transistor $T_1$.

As the emitter of the transistor $T_1$ is biased by the stored voltage of the capacitor $C_2$, the transistor $T_1$ is initially OFF and, after the above sequence turns ON when the time defined by the formula $$E \left( 1 - e^{-\frac{t}{C_1 R_1}} \right)$$

(i.e., the exposure time) passes and the base voltage $V_3$ becomes higher than the emitter voltage. As the transistor $T_1$ turns ON, the transistor $T_4$ switches OFF and the electro-magnet M is de-energized. As a result, the armature operating lever 18 and armature lever 27 are integrally rotated clockwise around the pin 20 because of the force of the spring 21 charged as described above. Therefore the gear 25 is disengaged from the gear portion 12c. As a result, the closing actuating lever 12 is again rotated counterclockwise, because of the force of the spring 15, from the position where it was stopped. During said counterclockwise rotation of the closing actuating lever 12, its inner side surface 12b contacts the pin 13b and, at that time, the lever 12 rotates the opening and closing lever 13 counterclockwise to close the shutter blade 17.

In the state that the shutter blade is closed, the pin 5a of the arm 5 and pin 34c of the cam plate 34 are respectively at positions where they are moved upward from their positions shown in FIG. 2. When the cocking plate 36 is pushed down against the force of the spring 37 from the above-mentioned state, the end face 36b first contacts the pin 34c and rotates the cam plate 34 against the force of the spring 35. Subsequently, the end face 36a contacts the pin 5a and rotates the arm 5 and release actuating lever 4 against the force of the spring 8. Therefore, the opening release lever 6, which was stopped in the state wherein its side surface 6c engaged the pin 10, follows the counterclockwise rotation of the release actuating lever 4 because of the force of the spring 9 and returns the change-over switches $S_3$ and $S_4$ to the state illustrated in FIG. 1 from the state which was caused by the pin 6a. The opening release lever 6 is stopped when the side surface 6b contacts the pin 10 after the arcuate side surface 6d engages the side surface 13a of the opening and closing lever 13. Because of further counterclockwise rotation of the release actuating lever 4 after the above described operation, the pin 4c pushes the side surface 12a and, consequently, the closing actuating lever 12 is rotated clockwise against forces of springs 15 and 16. When the bent portion 4a of the release actuating lever 4 engages the hook portion 1a of the release lever 1, and the pin 5a of the arm 5 closes the switch $S_2$, all elements are brought to the cocked state shown in FIG. 2.

Now, the process of diaphragm aperture control in the present invention is described below.

First of all, in the delay circuit comprising the capacitor $C_2$ and resistor $R_2$, the time until the charged voltage of the capacitor $C_2$ reaches the power-source voltage E is constant, i.e., $T = C_2 R_2$ and it is so arranged that the cam plate 34 rotates according to the course of time within the range of the above-mentioned time in order to determine the diaphragm aperture.

As the afore-mentioned divided voltage $V_1$, established by the photoconductive element $R_1$ and comparison resistor $R_3$, decreases when brightness of the object to be photographed increases, the time until the charged voltage $V_2$ of the capacitor $C_2$ reaches the relation of $V_2 \geq V_1$ also becomes shorter and, consequently, the diaphragm aperture is determined in inverse proportion to brightness of the object to be photographed. Furthermore, since the exposure time is controlled by making a comparison between the charged voltage $V_2$ of the capacitor $C_2$, stored when setting the diaphragm aperture, and the charged voltage $V_3$ of the capacitor $C_1$ in the delay circuit comprising the capacitor $C_1$ and photoconductive element $R_1$, the exposure time is also in inverse proportion to brightness of the object to be photographed.

Figure 3:
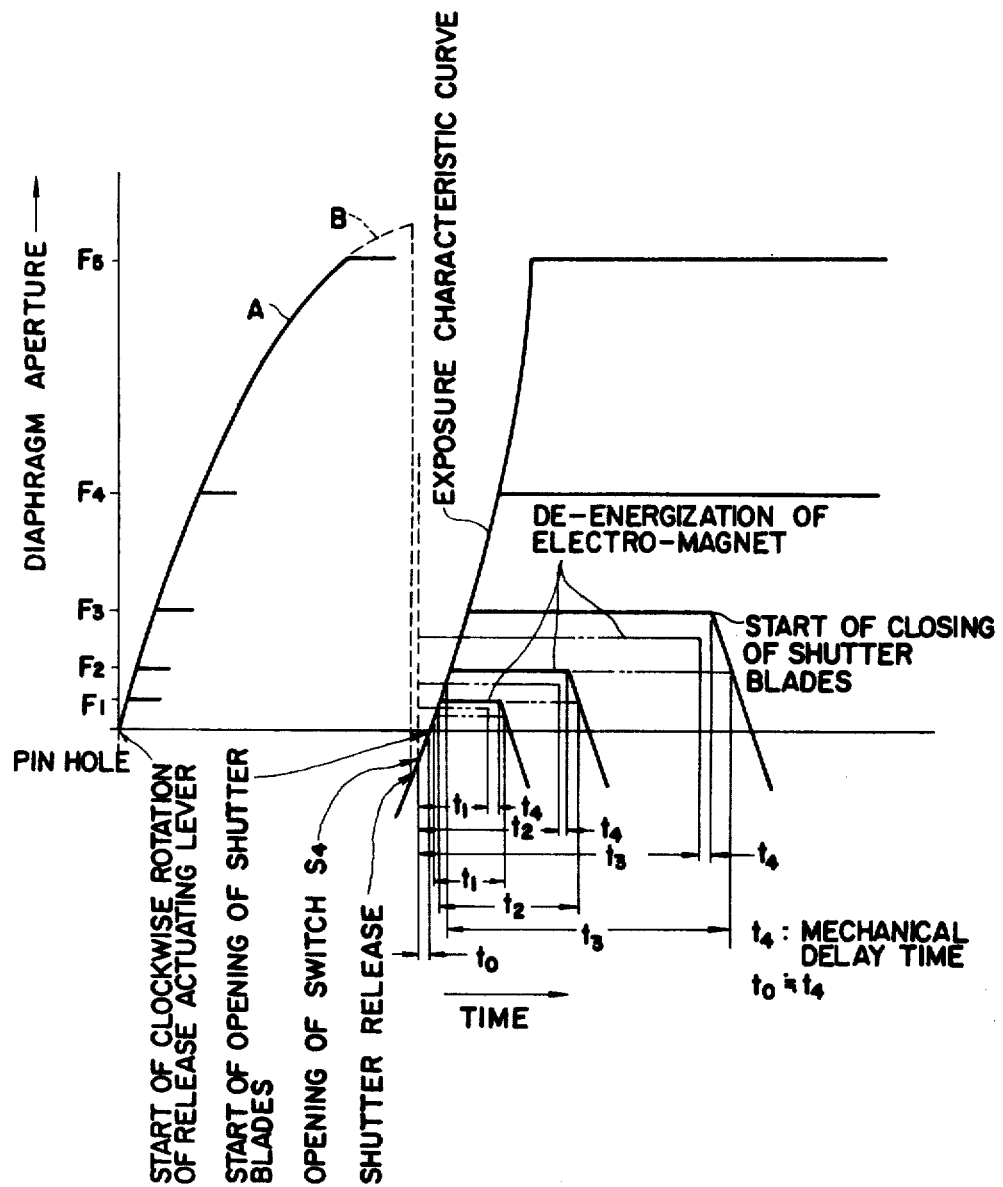
FIG. 3. shows an explanatory graph illustrating the sequence of operation from the time of determining the diaphragm aperture to the time when the shutter blades are opened and closed.

The above described mode of operation is shown in FIG. 3. The curve A shows the amount of movement of the cam surface 34b in respect to the pin 13c of the opening and closing lever 13. The dotted line B shows the mode of operation from the final stage of the diaphragm aperture setting operation until the arcuate side surface 6d of the opening release lever 6 disengages from the side surface 13a of the opening and closing lever 13. In the range from the minimum aperture $F_1$ to the maximum aperture $F_5$, the diaphragm aperture can be set steplessly.

Figure 1:
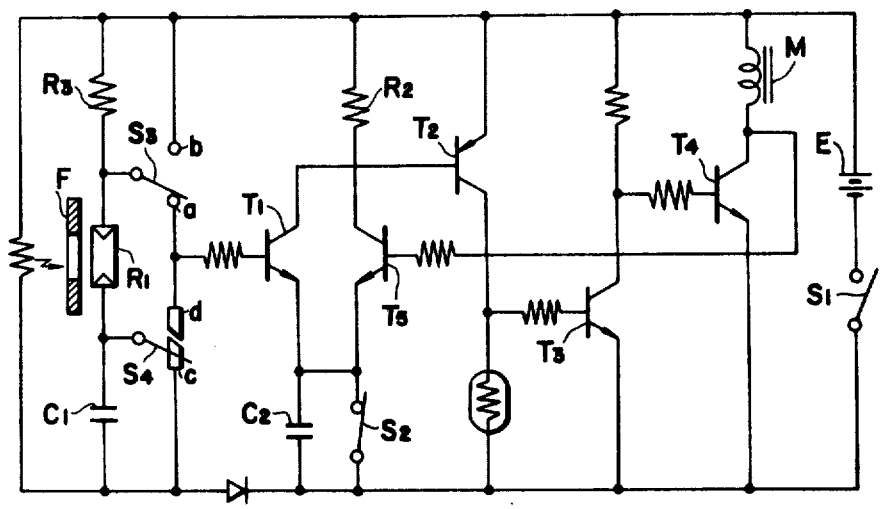
FIG. 1 shows a wiring diagram illustrating an embodiment of the exposure control circuit used in the programmed-type electric shutter according to the present invention.
Figure 4:
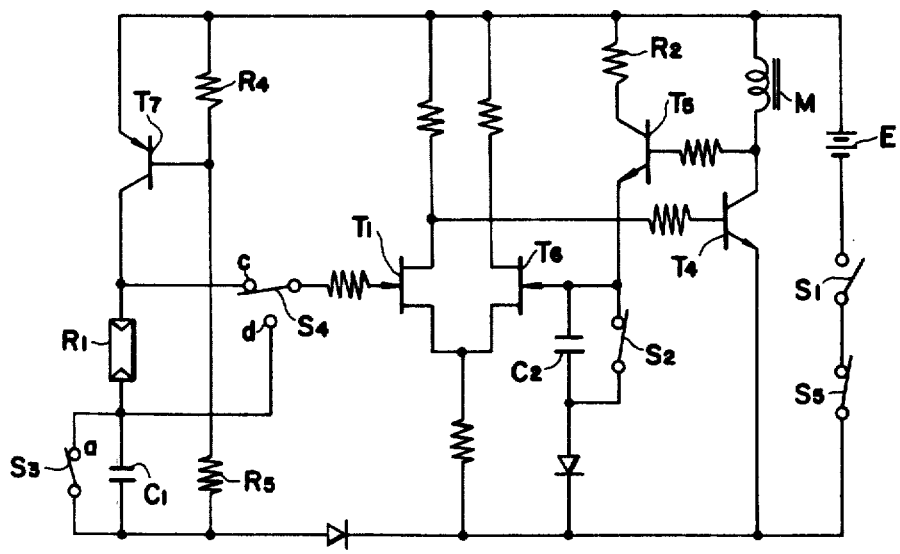
FIG. 4 through FIG. 6 respectively show wiring diagrams illustrating different embodiments of the exposure control circuit shown in FIG. 1.

As the circuit shown in FIG. 4 has substantially the same functions as the circuit shown in FIG. 1, the same symbols as those in FIG. 1 are given to those elements having the same or similar functions as those shown in FIG. 1. The circuit shown in FIG. 4, however, differs from the circuit shown in FIG. 1 in that the circuit shown in FIG. 4 comprises a constant-current circuit comprising a transistor $T_7$ and resistors $R_4$ and $R_5$, a field effect transistor $T_6$ instead of transistors $T_2$ and $T_3$ shown in FIG. 1, an auxiliary switch $S_5$ which can be opened by the pin 12d of the closing actuating lever 12 and which is inserted in series with the power switch $S_1$, and the change-over switch $S_3$ being used only as an ON-OFF switch for the contact a. As the operation of the control circuit shown in FIG. 4 in conjunction with control mechanism shown in FIG. 2 can be easily understood from the above description regarding the operation of the control circuit shown in FIG. 1 and control mechanism shown in FIG. 2, its detailed description is omitted here.

The exposure control circuits shown in FIGS. 1 and 4 respectively employ the photoconductive element $R_1$ as the light-receiving element. However, it is also possible to employ a photoelectric element as the light-receiving element.

Figure 5:
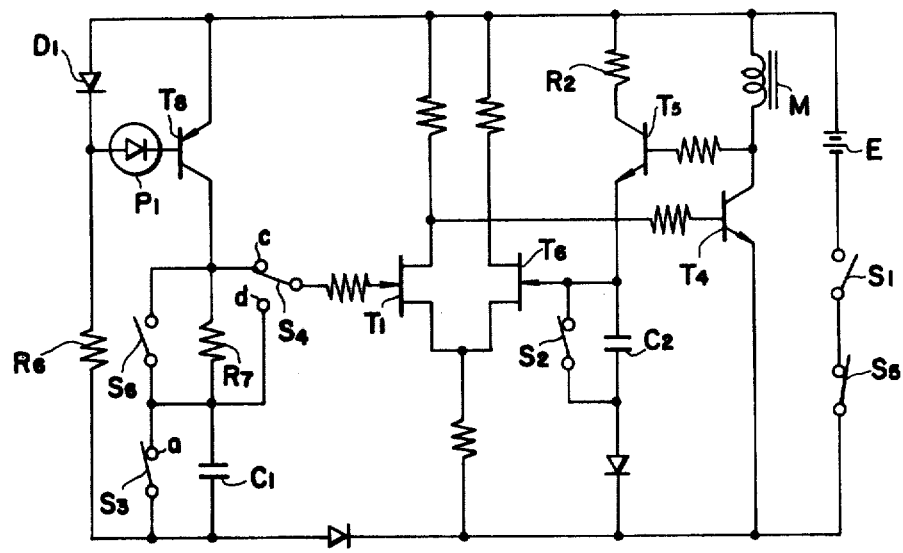

FIG. 5 shows an embodiment employing a photoelectric element as the light-receiving element. In the following description of operation of said embodiment, the same symbols one used for elements which have the same functions as the elements shown in FIG. 4.

In FIG. 5, reference symbols $P_1$, $T_8$, $R_6$ and $D_1$ respectively represent a photoelectric element, transistor, resistor and diode which constitute a constant-current circuit wherein the output of said photoelectric element $P_1$ serves as the reference output. Symbol $R_7$ represents a controlling resistor which can be connected in the constant-current circuit. Symbol $S_6$ represents a switch arranged, for the shutter mechanism shown in FIG. 2, to be closed at the time when contact d is closed.

As operation of this circuit is not much different than the circuit shown in FIG. 4, the description given below is only for portions of the circuit which differ from those of FIG. 4. For example, in the course of diaphragm aperture control, the control resistor $R_7$ is conductive instead of the photoconductive element $R_1$ shown in FIG. 4, and the circuit shown in FIG. 5 is of such type to vary the constant-current value of the circuit according to variation of brightness of the object to be photographed instead of varying the resistance value as in the constant-current circuit shown in FIG. 4. Of course, operation in respect of exposure time control also changes corresponding to the difference in the type of the circuit.

In the shutter mechanism shown in FIG. 2, the time of shutter release by the governor 11 always occurs later than the time when the diaphragm aperture is established. In practice, however, it is desirable that the shutter be released just after the diaphragm aperture is set. This object can be attained, in the circuits shown in FIG. 4 and FIG. 5 for example, by stopping the operation of the delay circuit for controlling the diaphragm aperture. This can be accomplished by actuating another electromagnet (which is not shown) by using a signal from the drain of the transistor $T_6$, which is turned on at the time when the diaphragm aperture is established, and by disengaging the anchor of the governor 11 by said actuation.

Figure 6:
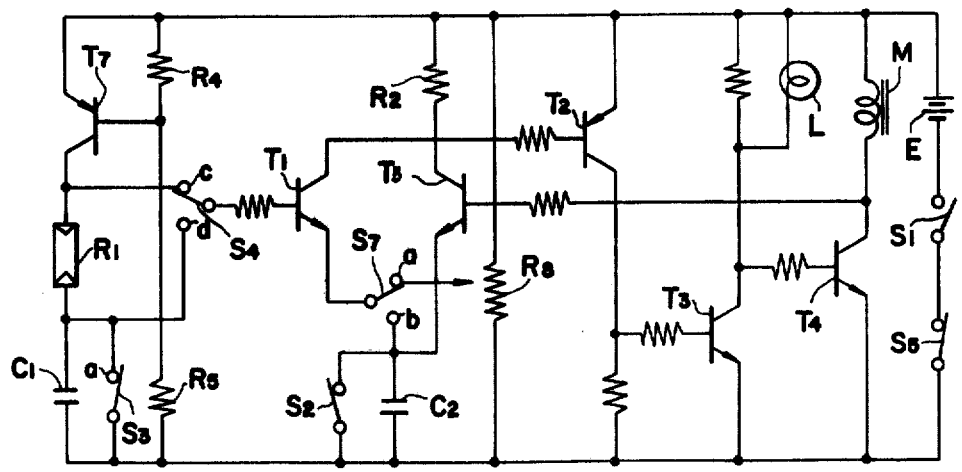

Still another embodiment of the exposure control circuit having an exposure warning circuit is shown in FIG. 6. In FIG. 6, reference symbol $R_8$ represents a potentiometer which is used, for example, for setting a camera-shake warning level. Reference symbol L represents a camera-shake warning lamp. Reference symbol $S_7$ represents a change-over switch constituting a camera-shake warning circuit when the switch $S_7$ is connected to the contact a. In the shutter mechanism shown in FIG. 2, the switch $S_7$ is changed over to the contact b before the afore-mentioned switch $S_2$ is opened and, in that state, an exposure control circuit similar to that shown in FIG. 4 is formed.

Therefore, when the power switch $S_1$ is closed, with the change-over switch $S_7$ being connected to the contact a as shown in FIG. 6, by rotating the release lever 1 counterclockwise to the degree that the hook portion 1a is not disengaged from the bent portion 4a of the release actuating lever 4, the exposure warning circuit is completed. If, in this state, the resistance value of the photoconductive element $R_1$ is high because the brightness of the object to be photographed is low, and the base potential of the transistor $T_1$ is higher than the emitter bias of the transistor $T_1$ supplied by the potentiometer $R_8$, the transistor $T_1$ turns ON. As a result, both transistors $T_2$ and $T_3$ turn ON and the lamp L lights to warn that the exposure time to be controlled according to brightness of the object to be photographed at that time may result in camera shake.

As the structure and functions of the exposure control circuit shown in FIG. 6 are basically same as those of the circuit shown in FIG. 4, a detailed explanation is omitted here. However, one a difference is that in the circuit shown in FIG. 4, the charged voltage of the capacitor $C_2$ in the delay circuit for controlling the diaphragm aperture and the stored voltage for exposure time control are applied to the gate of one of transistor constituting a differential amplifier. On the other hand, in the circuit shown in FIG. 6, said voltages are applied to the emitter of the afore-mentioned transistor $T_1$.

In the above explanation, only a camera-shake warning is described. It is, evident however, that an over-exposure warning, under-exposure warning, etc. can also be provided to light respective warning lamps by adding separate lamps and potentiometers or by providing required intermediate terminals to one potentiometer and switching said terminals in sequence.

The shutter mechanism shown in FIG. 2 employs shutter blades which also serve as diaphragm blades. Now, referring to FIG. 7, an embodiment which comprises separate diaphragm blades and shutter blades is described in relation to the exposure amount control circuit shown in FIG. 4.

Figure 7:
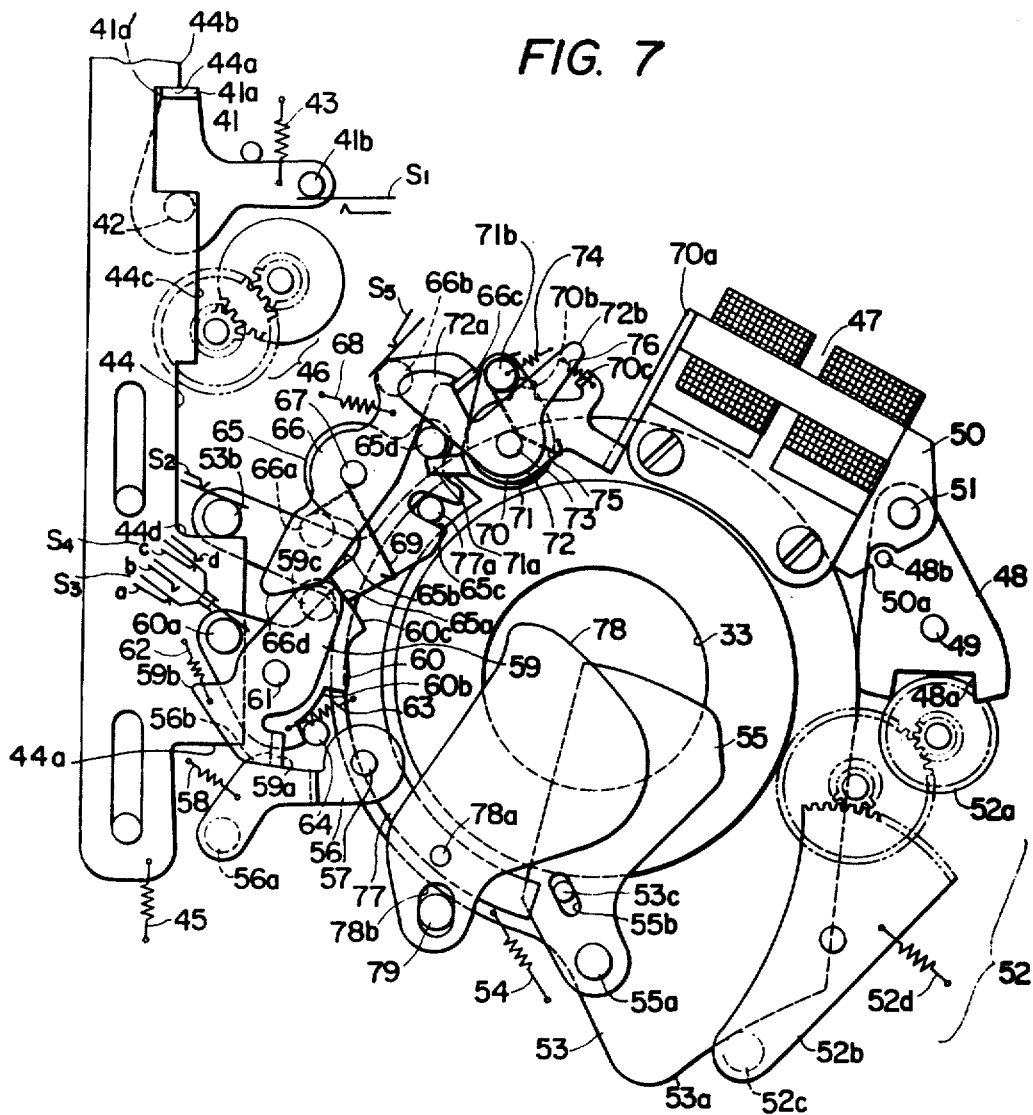
FIG. 7 shows a plan view of an embodiment of the shutter mechanism having separate diaphragm blades and shutter blades, the mechanism being in a cocked state.

In FIG. 7, numeral 41 designates a release lever pivotably mounted to a pin 42. Said release lever 41 has a bent portion 41a and a pin 41b for closing the power switch $S_1$ and is biased counterclockwise by a spring 43. Numeral 44 designates a release actuating plate arranged to be movable in upward and downward direction. Said release actuating plate has a stepped portion 44a engageable with said bent portion 41a, a side surface 44b engageable with a side surface 41a' of said bent portion 41a, a rack portion 44c and side surfaces 44d and 44e, and plate 44 is biased downwardly by a spring 45. Numeral 46 designates a governor which meshes with said rack portion 44c and functions to delay the movement of said release actuating plate 44. Numeral 47 designates an electro-magnet. Numeral 48 designates an armature lever for controlling the diaphragm aperture pivotably mounted to a pin 49 and havng an anchor portion 48a and pin 48b. Numeral 50 designates an armature pivotably mounted to a supporting pin 51 fixed to said armature lever 48. Said armature 50 has a cut portion 50a engageable with said pin 48b and faces to one side of said electromagnet 47. Numeral 52 designates a governor for setting the diaphragm aperture in which a gear 52a engages said anchor portion 48a, a pin 52c is fixed to a sector gear 52b and said sector gear 52b is biased clockwise by a spring 52d. Numeral 53 designates a diaphragm aperture controlling cam plate arranged to be rotatable about said exposure aperture 33. Said cam plate 53 has a cam surface 53a engageable with said pin 52c, a pin 53b which engages the side surface 44d of said release actuating plate 44 and opens said switch $S_2$ in the initial stage of rotation of the cam plate 53, and another pin 53c, and plate 53 is biased counterclockwise by a spring 54. Numeral 55 designates one of a set of five diaphragm blades, the remaining four blades of which are not shown. Said diaphragm blade 55 has a fulcrum pin 55a, which fits in a hole formed in a not shown base plate, and a slot 55b for fitting said pin 53c. Numeral 56 designates a shutter release lever pivotably mounted to a pin 57. Said shutter release lever 56 has a pin 56a engageable with the side surface 44e of said release actuating plate 44, and a hook portion 56b and is biased clockwise by a spring 58. Numeral 59 designates a cocking lever pivotably mounted to a pin 61. Said cocking lever 59 has a bent portion 59a engageable with said hook portion 56b, an end face 59b and a pin 59c and is biased clockwise by a spring 62. Numeral 60 designates an opening release lever pivotably mounted to the pin 61. Said opening release lever 60 has a pin 60a engageable with said end face 59c and serving to disconnect said switch $S_3$ from the contact a and to move the change-over switch $S_4$ from the contact c to the contact d, a cut portion 60b, an arcuate side surface 60c, and the lever 60 is biased counterclockwise by a spring 63. Numeral 64 designates a pin fixed to the not shown base plate and serving for to limit the moving range of said opening release lever 60 by engaging the side surface of said cut portion 60b. Numeral 65 designates an opening and closing lever pivotably mounted to a pin 67 and having an end face 65a engageable with said arcuate side surface 60c, a side surface 65b, a fork portion 65c and a pin 65d. Numeral 66 designates a closing actuating lever pivotably mounted to the pin 67. Said closing actuating lever 66 has a pin 66a engageable with said side surface 65b, a pin 66b for opening said auxiliary switch $S_5$, a bent portion 66c and an end face 66d engageable with the pin 59c of said cocking lever 59. Lever 66 is biased counter-clockwise by a spring 68. Numeral 69 designates an opening actuating spring connected between said opening and closing lever 65 and closing actuating lever 66 and providing an actuating force for clockwise rotation of said opening and closing lever 65. Numeral 70 designates an armature lever for controlling the exposure time pivotably mounted to a pin 73 and having an armature portion 70a facing the other side of said electro-magnet 47 and bent portions 70b and 70c. Numeral 71 designates a hold lever pivotably mounted to the pin 73. Said hold lever 71 has an arm 71a engageable with the pin 65d of said opening and closing lever 65 and a pin 71b engageable with said bent portion 70b. Lever 71 is biased clockwise by a spring 74. Numeral 72 designates a closing release lever pivotably mounted to the pin 73 and having a hook portion 72a engageable with the bent portion 66c of said closing actuating lever 66 and an arm 72b engageable with said bent portion 70c. Numeral 75 designates a spring connected between said armature lever 70 and hold lever 71 and providing an actuating force for counter-clockwise rotation of said armature lever 70. Numeral 76 designates a spring connected between said armature lever 70 and closing release lever 72 and providing an actuating force for clockwise rotation of said release lever 72. Numeral 77 designates a sector ring rotatably supported by the not shown base plate and having a pin 77a engageable with the fork portion 65c of said opening and closing lever 65. Numeral 78 designates one of a set of five shutter blades, the remaining four blades of which are not shown. Said shutter blade 78 has a pin 78a engageable with the hole of said sector ring 77 and a slot 78b for fitting a pin 79 which is fixed to the not shown base plate.

Operation of the above-mentioned embodiment of the electric shutter is described below.

When the release lever 41 is rotated clockwise from the cocked state shown in FIG. 7 against the force of the spring 43 to close the power switch $S_1$ by the pin 41b, and to disengage the bent portion 41a from the stepped portion 44a, the release actuating plate 44 is moved downwardly by the force of the spring 45. At that time, movement of the release actuating plate 44 is delayed by means of the governor 46. As a result of said movement of the release actuating plate 44, the side surface 44b comes to a position to prevent returning movement of the bent portion 41a. Therefore, even when the release lever 41 is freed, the side surface 41a is stopped by the side surface 44b and, therefore, the power switch $S_1$ is held in its closed state.

As the pin 53b follows the side surface 44d according to delayed movement of the release actuating plate 44, the cam plate 53 for controlling the diaphragm aperture begins to rotate counterclockwise because of the force of the spring 54. By the above-mentioned movement of the pin 53b, the switch $S_2$ is opened and said diaphragm aperture control circuit begins its operation. At the same time, as the pin 53c is fitted in the slot 55b, the diaphragm blade 55 begins to open gradually. In the initial stage of operation of the diaphragm aperture control circuit, the electromagnet 47 (M) is not yet energized. Therefore, the armature 50 is not attracted and the armature lever 48 for controlling the diaphragm aperture can be swung. Cam plate 53 rotates counterclockwise pushing the pin 52c of the sector gear 52b in the governor 52 to set the diaphragm aperture with the cam surface 53a operating against the force of the spring 52d.

When the electro-magnet 47 is energized at a predetermined time as described previously, the armature 70a of the armature lever 70 for controlling the exposure time and armature 50 are attracted by the electromagnet 47 at the same time. Therefore, the armature lever 48 cannot be swung anymore, gear 52a is locked by the anchor portion 48a and the governor 52 cannot rotate further. Consequently, the cam plate 53 stops and the diaphragm aperture is set in that state.

Following the above operation, the release actuating plate 44 moves further and, at the final stage of its movement, its side surface 44e pushes the pin 56a and rotates the shutter release lever 56 counterclockwise against the force of the spring 58. When the hook portion 56b disengages from the bent portion 59a because of said counterclockwise rotation, the cocking lever 59 is rotated clockwise by the force of the spring 62. As a result of such clockwise rotation, the set lever 59 pushes the pin 60a by its end face 59b and rotates the opening release lever 60 clockwise against the force of the spring 63. Because of clockwise rotation of said opening release lever 60, at first the pin 60a moves the change-over switch S₄ from the contact c to the contact d and, at the same time, disconnects the switch S₃ from the contact a. Thus, the afore-mentioned exposure time control circuit begins its operation. Subsequently, the arcuate side surface 60c disengages from the end face 65a. Consequently, the opening and closing lever 65 quickly rotates clockwise because of the force of the spring 69, rotates the sector ring 77 counterclockwise because the fork portion 65c is fitted to the pin 77a and opens the shutter blade 78 to the fully opened position. Additionally, the opening and closing lever 65 pushes the arm 71a by its pin 65 d to rotate the hold lever 71 counterclockwise against the force of the spring 74 and charges the spring 75 with the actuating force for counterclockwise rotation of the armature lever 70.

When the electro-magnet 47 is de-energized after a pre-determined time as described above, the armature lever 70 is rotated counterclockwise by the force of the charged spring 75. During counterclockwise rotation, the armature lever 70 pushes the arm 72b by its bent portion 70c and rotates the closing release lever 72 counterclockwise. As a result, the hook portion 72a disengages from the bent portion 66c. Therefore, the closing actuating lever 66 is rotated counterclockwise by the force of the spring 68. As the pin 66b moves because of the above, said power switch S₅ is opened. At the same time, the pin 66a pushes the side surface 65b to rotate the opening and closing lever 65 counterclockwise. Thus, the shutter blade 78 is closed from its fully opened position.

When the release actuating plate 44 is returned to the position shown in FIG. 7 against the force of the spring 45 and the cocking lever 59 is returned to the position shown against the force of the spring 62, all elements are brought to the cocked state as shown.

I claim:

1. An electric shutter comprising a diaphragmaperture controlling cam plate, a mechanical delay means engaged with said diaphragm-aperture controlling cam plate to delay the movement of said cam plate, an armature lever engageable with said mechanical delay means, an armature rotatably supported by said armature lever, an electromagnet facing said armature and arranged so as to be able to attract said armature, an exposure control circuit connected to said electromagnet and having therein a first RC delay circuit for controlling the diaphragm aperture and a second RC delay circuit for controlling the exposure time, diaphragm blades operatively connected to said diaphragm aperture controlling cam plate, and change-over switches contained in said exposure control circuit and changed over to actuate said second RC delay circuit when said shutter is opened, said first RC delay circuit being operated when said diaphragm-aperture controlling cam plate starts its movement, and then said electro-magnet being energized by said exposure control circuit to stop said movement of said diaphragm-aperture controlling cam plate at the time when the voltage across terminals of a capacitor comprising a portion of said first RC delay circuit becomes equal to the voltage across both terminals of a resistor comprising a portion of said second RC delay circuit; and said electro-magnet being de-energized by said exposure control circuit to close said shutter at the time when the voltage across terminals of the capacitor of said first delay circuit becomes equal to the voltage across terminals of said capacitor of said second delay circuit.

2. An electric shutter according to claim 1, in which said first delay circuit includes a resistor comprising a photoconductive element.

3. An electric shutter according to claim 2, in which said shutter further comprises a constant-current circuit connected to said photoconductive element.

4. An electric shutter according to claim 1, in which said first delay circuit includes a resistor, said shutter further comprising a photoelectric element connected to said resistor.

5. An electric shutter according to claim 1, in which said exposure control circuit comprises an exposure warning lamp.

6. An electric shutter according to claim 1, in which said diaphragm-aperture controlling cam plate has a cam surface therein, the opened position of said blades being determined by said cam surface engaging means which operatively connect the cam plate to said blades.

* * * * *